(12) United States Patent
Schriner (10) Patent No.: US 8,875,739 B2
(45) Date of Patent: Nov. 4, 2014

(54) PLUG VALVE WITH BOWING RIGID ARMS (75) Inventor: Gregory Schriner, Peoria, AZ (US)

(73) Assignee: The Dial Corporation, Scottsdale, AZ (US)

( * ) Notice: Subject to any disclaimer, the term of this patent is extended or adjusted under 35 U.S.C. 154(b) by 0 days.

(21) Appl. No.: 13/479,569

(22) Filed: May 24, 2012

(65) Prior Publication Data

US 2013/0160875 A1    Jun. 27, 2013

Related U.S. Application Data (60) Provisional application No. 61/579,069, filed on Dec. 22, 2011.

(51) Int. Cl.
*F16K 15/14* (2006.01)

(52) U.S. Cl.
USPC ........................................... 137/852; 137/532

(58) Field of Classification Search
USPC .......... 137/532, 537, 852, 859; 251/337, 902; 267/158
See application file for complete search history.

(56) References Cited

U.S. PATENT DOCUMENTS

| | | | | |
|---|---|---|---|---|
| 1,963,101 | A * | 6/1934 | Sawtelle | 215/290 |
| 2,249,971 | A * | 7/1941 | Mecorney | 137/537 |
| 3,131,646 | A * | 5/1964 | Parrott | 417/454 |
| 3,419,031 | A * | 12/1968 | Holger et al. | 137/102 |
| 3,508,576 | A * | 4/1970 | Gross | 137/859 |
| 3,626,980 | A * | 12/1971 | Svensson | 137/614.2 |
| 3,732,884 | A * | 5/1973 | Strom | 137/218 |
| 3,862,281 | A * | 1/1975 | Uchiyama | 261/114.4 |
| 6,817,374 | B2 * | 11/2004 | Onstenk et al. | 137/1 |
| 6,983,924 | B2 * | 1/2006 | Howell et al. | 251/118 |
| 7,721,763 | B2 * | 5/2010 | Choksi | 137/859 |
| 8,424,562 | B2 * | 4/2013 | Berglund | 137/512.15 |
| 2008/0196779 | A1 * | 8/2008 | Freeman et al. | 137/852 |
| 2012/0181471 | A1 * | 7/2012 | Koeroghlian et al. | 251/337 |

* cited by examiner

*Primary Examiner* — John Rivell
*Assistant Examiner* — R. K. Arundale
(74) *Attorney, Agent, or Firm* — David K. Benson (57) ABSTRACT

A movable valve for a valve assembly is described. The present valve comprises a plug attached to an immovable mounting flange by at least two non-resilient spider-like legs comprising first and second rigid leg segments that meet at hinging apexes positioned higher than the plug. The plug resists vertical displacement by virtue of the stiff leg segments having appropriately configured curvature and length. Actuation of the valve is through vertical displacement of the plug against the biasing forces, wherein displacement of the plug causes bowing of the legs without any stretching or change in the length of the leg segments.

6 Claims, 5 Drawing Sheets

PLUG VALVE WITH BOWING RIGID ARMS

CROSS REFERENCE TO RELATED APPLICATIONS

This application claims priority to U.S. Provisional Application No. 61/579,069 filed on Dec. 22, 2011 and entitled "Plug Valve with Bowing Rigid Arms."

FIELD OF THE INVENTION

The present invention generally relates to valves and diaphragms for use in bottle closures for liquid dispensing, and more particularly relates to a plug valve biased in a closed position against a valve seat by the operation of rigid, bowing arm members.

BACKGROUND OF THE INVENTION

A great number of resilient valves are disclosed throughout the patent literature and are found in the marketplace in everything from sports bottles, spigots for water and wine vessels, and various dispensers in the food and beverage industry, to many medical devices. A resilient valve member refers to a movable member present within a valve assembly that can temporarily seal an orifice in liquid dispensing or liquid/gas pressure relief. Ideally, resilient valve members are molded from a unitary piece of rubber or other defolinable, stretchable material such as a silicone elastomer. A resilient valve member is then seated into the valve assembly so that it can bias against and seal an orifice opening, usually through a bias against a valve seat. Holding the resilient valve member into the valve assembly may be accomplished by a simple press/friction fit of the valve member into a complementary shape, or by a separate retaining ring used to lock the member firmly down. Pressure applied to the opposite side of the seal, either from the insertion of a straw tube (mechanical pressure), or from impinging liquid or gas (liquid/gas pressure, such as seen in check-valves) pushes the resilient member off the seal and opens the package for liquid or gas exit. Removal of the tube, or cessation of the liquid/gas pressure, causes the resilient valve to return to its original biased position, sealing the opening. The return of the valve member is possible through the "memory" inherent the resilient valve member. That is, rubber and various silicone elastomer parts have the ability to return to their molded shapes after being temporarily deformed such as stretching. Hence these materials are ideal for use in molding resilient valve members.

Resilient valve members may be classified as plug valves when the actual sealing portion of the resilient member is plug shaped in order to seal (or plug) against a circular opening like a small orifice. In particular, a small tubular member may extent from a closure into the inside of a liquid package, and may terminate in the shape of a valve seat (a chamfered circumferential lip). The plug portion of the resilient valve member can be proportioned and shaped such that it will fit partly within the end of the tube, sealing against the valve seat. Stretchable or otherwise deformable extensions emanating from the plug portion of the resilient valve member allow the plug portion to be temporarily pushed off the seat by an inserted spigot or by impinging pressure through the stretching or deforming of the extensions. The more relevant art in this refined area of resilient plug valve members is discussed below.

U.S. Pat. No. 7,721,763 (Choksi) discloses a one-way flow valve that incorporates one of several resilient valve member designs. One configuration ('763, FIG. 3) is a relatively flat member having a disc shaped plug area and spiral flexible arms radiating from the disc area to a retaining washer-shaped periphery. Another configuration ('763, FIG. 7) is a "hat" shape with a centrally located disc plug set above a retaining washer, with the plug connected to the retaining washer with stretchable connecting arm portions. Similar configurations for the valve member are disclosed by Choksi in U.S. Pat. No. 5,727,594, particularly in FIGS. 6-8.

U.S. Pat. No. 7,287,545 (Zelson) discloses a check valve that incorporates one of a variety of resilient member designs referred to as "the molded elastomeric valve body." As best seen in FIGS. 1 and 9 of '545, these elastomeric parts generally have a disc or plug-shaped central feature 14 connected to a relatively flat flange feature 20 (referred to as a gasket system) through any number of flexible arms 12. The resilient members are generally planar, with the gasket flange clamped around its circumference to the valve assembly by a clamping system that ensures the plug of the resilient member is biased against the valve seat.

U.S. Pat. No. 6,409,707 (Guala) discloses an anti-siphon valve for medical infusion lines that comprises a resilient member referred to as the "elastic open-close element." Here, the element is cup-shaped when not deformed, and it comprises a circular bottom wall and skirt. The cup-shaped resilient element is clamped within the valve assembly such that the peripheral edge (the shoulder where the disc shaped top meets the circumferential skirt) is held in fluid-tight contact against the annular valve seat.

U.S. Pat. No. 6,390,130 (Guala) discloses another valve for medical infusion lines that comprises a relatively flat resilient valve member (referred to as a "diaphragm") that comprises an annular peripheral section and a central sealing disc that are connected by a crown of spaced apart arms. The Guala diaphragm is inserted, and secured, between first and second tubular connectors such that the disc portion of the diaphragm acts on the annular valve seat to keep the valve in a normally closed state.

U.S. Pat. No. 4,712,583 (Pelmulder wt al.) discloses a passive flat-top valve for infusion systems comprising a resilient member with a valve disk that is the sealing element and a static seal ring that acts as the seal between upper and lower housing elements and as a rigid support structure from which the valve disk may be suspended. The valve disk portion of the resilient member is biased against one of the housing members to seal across an orifice.

PCT Application Publications WO 2010/055309 and WO 2010/055314 (Xianzhi et al.) disclose a dispensing valve having a resilient valve member similar in shape to the hat-shaped valve disclosed by Choski ('763). The Xianzhi valve has a central sealing valve member connected to a valve plate via a number of "biasing elements." The valve plate is positioned lower and centrally outward from the valve member. The biasing elements are essentially stretchable straps that can stretch when the plug element is vertically displaced off its valve seat. The washer-shaped valve plate has locating holes that line up with locating posts protruding from the underside of the cap. The resilient valve is locked into position within the closure by a rigid fixing plate that sandwiches the resilient valve against the underside of the cap.

Lastly, Bargo discloses in U.S. Patent Application Publication No. U.S. 2007/0023458 a siphon head that incorporates any one of a number of elastomeric closure elements. Most of the closure elements disclosed feature a half sphere-shaped or conical head for plugging a valve seat, with the plug element connected to an outer ring through any number of elastic memory members such as arms or ribs.

Accordingly, and in spite of the variety of resilient valves seen in the prior art, it is desirable to invent new ways to configure movable valve members for use in valve assemblies/closures on liquid packaging, which may be easier and/or less expensive to manufacture. It is also desirable to find new shapes and configurations for valve members that may be easier to secure within a valve housing assembly and easier to seat against a valve seat or other orifice. Other desirable features and characteristics of the present invention will become apparent from the subsequent detailed description of the invention and the appended claims, taken in conjunction with the accompanying drawings and this background of the invention.

BRIEF SUMMARY OF THE INVENTION

A movable valve member is provided that comprises a central plug portion connected to an outer mounting flange through a number of bowing, segmented rigid legs. The innovative difference between the present invention and the prior art is that the leg members of the valve merely bow when the plug portion of the valve is displaced from its biased position. There is no stretching or deforming of the legs of the present valve such as seen during actuation of resilient valves in the prior art. Preferably, the legs of the present valve member are rigid and not stretchable in any way, but rather only movable. The present invention also comprises a valve assembly that incorporates the movable valve member, which can be structured within a bottle closure and incorporated as part of a liquid dispensing system.

In preferred embodiments of the present invention, a sphere-, half-sphere-, partial sphere- conical-, spheroid-, or cylindrical-shaped sealing plug portion is connected via at least two "spider-like" legs to a mounting washer or similar flange feature that is spatially lower that the sealing plug portion of the valve. In the preferred embodiment, not only does the sealing plug sit higher than the mounting flange of the valve, but each movable leg extends about twice the vertical distance between the mounting flange and the sealing plug.

In another preferred embodiment of the present invention, a dispensing closure comprises a valve assembly that seals an orifice in the closure by use of a valve having at least two segmented rigid "spider-like" legs that bias a sealing plug element against the peripheral opening of an orifice tube.

In the most preferred embodiment of the present invention, the movable valve takes on the appearance of a harvestman arachnid (*Opiliones*) with the plug portion of the present valve resembling the abdomen and the movable legs of the valve resembling the long legs of the arachnid. The spider-like legs of the present valve bow outward in response to vertical displacement of the plug portion of the present valve from its biased position.

In another preferred embodiment of the present invention, a movable valve comprises a plug portion connected via at least two segmented legs to a mountable flange member. The legs are configured to hinge at three distinct locations: (1) at the connection between the leg and the plug portion; (2) between the segments of each leg; and (3) at the connection between the leg and the mounting flange portion.

BRIEF DESCRIPTION OF THE DRAWINGS

The present invention will hereinafter be described in conjunction with the following drawing figures, wherein like numerals denote like elements, and.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Generally speaking, the present plug valve comprises a centrally located plug portion, a mounting flange substantially concentric with the plug portion and surrounding it, and wherein at least two flexible segmented rigid legs connect the plug portion to the mounting flange. When the plug valve is mounted into a valve assembly for use, the mounting flange portion of the valve is expected to be immobilized, such as by use of a mounting ring or plate to pin it into the assembly. Importantly, the plug valve is configured such that the mounting flange is below the central plug portion, and such that the apex of each segmented leg extends above the plug portion. With this configuration, it is preferred that the present valve be used to actuate the opening orifice of a raised pipe, with the mounting flange fastened securely around and below the top of the pipe. The legs of the plug valve may reach to a height that is twice the distance between the plug portion and the mounting flange. The rigid legs preferably arc high over the plug portion, and are able to press the plug portion downwards to bias the plug portion against a valve seat. The valve of the present invention is preferably configured to be biased in a closed position against a valve seat in a valve assembly, although other uses for the present plug valve may be conceived where the plug valve is biased in an open position until mechanical forces push it temporarily against the valve seat.

The sealing portion of the plug valve of the present invention, i.e. the plug or "sealing plug," may be any shape necessary to temporarily plug an orifice and/or seal a valve seat. Depending on the shape and size of the orifice to be sealed, the plug portion of the present valve should be dimensioned appropriately such that it can fit on, or perhaps even partially into, the orifice requiring temporary sealing. As mentioned, the plug portion may be of any shape and size as needed. For example, the sealing plug portion may take the shape of a disk, sphere, half-sphere, partial sphere, cone, spheroid, or cylinder. Depending on the orifice requiring actuatable sealing, the plug portion of the present plug valve is expected to be from about 1 mm to about 10 cm in diameter, and from about 1 mm to about 10 cm in thickness. Ideally, and for most practical packaging and liquid dispensing applications, the plug portion will likely be about 2-10 mm in diameter and about 2-10 mm in thickness. For example, a preferred plug portion will be spheroid in shape and measure about 5 mm in diameter and about 3 mm in thickness. It is preferred that the sealing plug have at least a resilient lower surface such that it can deform somewhat against and/or in the orifice to seal properly. Alternatively, the entire plug portion of the valve may be resilient and deformable. The plug may be molded entirely of an elastomeric material or it may be partially formed from elastomeric material and partially from a more rigid polymer such as polypropylene or polyethylene. Since the entire plug valve of the present invention is preferably molded as a single unitary piece, differing polymeric materials may be injected into various ports of the mold to create a valve having portions of differing materials. For example, the portion of a mold used in forming the sealing plug portion of the valve may have its own inlet port through which elastomeric monomer can be injected. The rest of the mold may be filled through appropriate injection ports with monomer mixtures that will polymerize to rigid or semi-rigid plastic. It is important to realize that the sealing plug portion of the present valve may be hollow or solid. It may be cup or bowl shaped, with the open side of the bowl either biased against the valve seat or on the opposite side of the plug from the valve seat. The plug portion may have any degree of sponginess, perhaps even being hollow and "balloon-like."

The mounting flange portion of the present plug valve is preferably ring shaped, and is preferably comprised of rigid plastic although any elastomeric material may be also be used for this portion of the present valve. The mounting flange functions as the name implies. It is for mounting the plug valve into a valve assembly. The valve assembly that may benefit from the valve of the present invention may be the closure for a bottle, or it may be a subassembly usable in a liquid flow system. Being preferably ring shaped, the mounting flange portion of the present valve is preferably about 5 mm to 15 cm in outer diameter, with a central aperture measuring about 2 mm to 14 cm in diameter. In this way the mounting flange portion is shaped like a "washer." The thickness of the mounting flange is anywhere from about 1 mm to about 5 cm, or whatever is sufficient for securing the present valve into a closure or valve assembly. In typical liquid packaging and flow applications, the mounting flange will probably be about 1 cm in outer diameter and about 5-8 mm in inner diameter, and will be about 1-2 mm thick. The shape of the mounting flange need not be ring shaped at all, meaning any shape is conceivable. However, for ease of manufacture, and for ease in spacing at least two bowing legs around the valve for movably connecting the plug portion to the mounting flange, the mounting flange will likely take the shape of a washer. Configured through the washer-shaped mounting flange may be a number of holes or any number of protrusions/lugs that may facilitate the indexing and mounting of the mounting flange (and hence the entire plug valve) into a closure or valve assembly. Most preferred is to configure at least two holes through the washer-shaped flange (in addition to the "hole" referred to as the aperture of the washer) and to use these holes to line up the valve in a valve assembly. For example, small upward projecting posts or pins may be used in the valve assembly for locating the present valve in the proper position, such as by lining up the posts/pins to project through the holes provided in the mounting flange. Depending on how the mounting flange is made, for example by molding this portion of the valve with fairly rigid plastic, the mounting flange may be simply press-fit into a recess of the valve assembly. In this way, an extra part, namely a mounting plate, is eliminated. Alternatively, and no matter how resilient the mounting flange portion of the present valve is, a mounting plate may be used to sandwich the mounting flange against a relatively flat portion of a valve assembly or bottle closure. Certainly the mounting flange portion of the present valve may be glued or sonically welded into the closure or valve assembly, either without any mounting plate or in conjunction with a mounting plate. For example, the present valve may be press-fit into an appropriately configured recess, a plastic mounting plate may then be press-fit over the mounting flange effectively pinning the flange in, and then the sandwiched assembly may be sonically welded together. A resilient valve having both a plug portion and a mounting flange where the flange is washer-shaped and configured below the plug is seen in PCT Application Publications WO 2010/055309 and WO 2010/055314 (Xianzhi et al.), both of which are incorporated herein by reference. These incorporated references also teach the concept of sandwiching the mounting flange of a resilient valve between a bottle closure and a mounting plate to seal an upstanding orifice pipe.

The most important feature to the present valve is the bowing legs, which are configured to connect the plug portion in movable relationship to the mounting flange. As mentioned, typical valves and diaphragms will have a stationary portion and a movable portion and some sort of stretchable/deformable straps between the two. The instant invention is distinguished from the prior art in that the legs connecting the plug portion to the mounting flange portion are not stretchable at all. Instead, it is preferred that the legs of the present valve bow and, as necessary, hinge. The preferred legs of the present valve have two segments each and three hinge points. The hinging connections include: (1) the connection between the mounting flange and the leg; (2) the connection between the two segments of any one leg; and (3) the connection between the leg and the sealing plug portion of the valve. The legs are preferably rigid, meaning these portions of the valve are molded from rigid plastic such as PET, polycarbonate, PE, HDPE, and/or PP. As mentioned, even though the present valve may be a single unitary part, separate injection ports in the mold may be used advantageously to produce a unitary valve having various portions of the valve made from differing materials. For example, only the plug portion may be a silicone elastomer whereas the remaining portions of the valve, including the mounting flange and the legs, may be fonned from stiffer plastic such as HDPE or PET. A first segment of the leg connects the plug portion to the hinging connection (apex) between the leg segments, and a second segment of each leg connects the first segment to the mounting flange. It is very important to note that either or both of the segments of any leg of the valve may be concave or convex in shape. For example, all segments may be convex, or all segments may be concave, with curvature being very slight or, alternatively, quite measureable. Alternatively, the first segments may all be concave whereas all second segments may be convex. Also, the legs may not be all the same. A first leg may comprise both a convex first segment and convex second segment, whereas a second leg may comprise both a concave first segment and a concave second segment. Such differing legs may be alternated around the valve in a symmetric or asymmetric manner. The bowing of the first segment is preferably more augmented than the bow of the second segment of any leg. In another preferred embodiment, the second segment may approach a relatively straight plastic segment. Depending on the utilization of combinations of concave and convex segments, the legs of the present valve may hinge more than they bow, or vice versa, when the plug portion of the valve is displaced vertically. The curvature of the segments, the length of the segments, the number and circumferential spacing of legs, the utilization of straight, convex, and/or concave segments, the materials used in the construction of the valve components, the height of the legs with respect to the height of the sealing plug, and the distance between the flange and sealing plug, all affect the biasing strength of the plug in a downwards, vertical direction, or in other words, the force that would need to be overcome from the opposite direction (with a spigot, or with liquid/gas pressure) to displace the sealing plug vertically off the valve seat.

The legs of the present valve are molded in hinging relationship to the mounting flange. What this means is that there is a living hinge region between each leg and the mounting flange. This may be configured as a thinner region of plastic across which the leg may hinge in relation to the mounting flange. It is important to note that each of these connections between leg and mounting flange may be anywhere around either the inner or outer periphery of the mounting flange. For example, it may be easier to mold the overall valve if the legs merge into the mounting flange at the inner edge (the washer aperture) rather than at the outer edge of the mounting flange. Additionally, the first segment of each leg is molded in hinging relationship to the plug portion of the valve, meaning that the first segment of any of the legs can hinge from the plug portion. Lastly, the first and second segments of any one of the legs are in hinging relation. Thus, between each of the first and second segments of any of the legs is a living hinge arrangement. Each of these three hinging regions becomes important when the plug valve of the present invention is actuated. Since the mounting flange will be immobilized in use, vertical displacement of the sealing plug will necessarily bow the legs out, and will more likely than not, cause hinging of the second leg segments from the mounting flange, since the mounting flange cannot move. That is, the angle between any leg and the mounting flange will increase at least somewhat, when the sealing plug is vertically displaced.

The valve of the present invention is more easily understood with a detailed discussion of the drawing figures.

Figure 1:
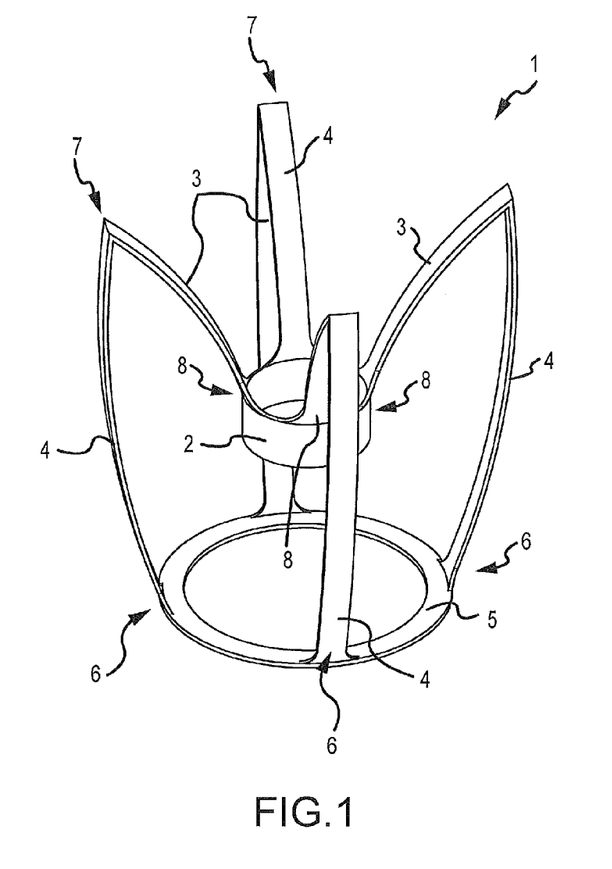
FIG. 1 illustrates a top perspective view of an embodiment of the movable valve of the present invention, showing four "spider-like" segmented legs connecting a mounting flange portion to a plug portion.

FIG. 1 illustrates a top perspective view of an embodiment of the present valve. As seen in this view, the plug valve 1 comprises a bowl-shaped plug portion 2 connected by four segmented spider legs, each comprising segments 3 and 4, to mounting flange 5. The plug portion 2 may be hollow to any degree, such as to appear bowl shaped, or it may be a solid rubbery element. The four dual-segmented spider-like legs are even spaced circumferentially around both the periphery of the sealing plug 2 and around the circular mounting flange 5. What is important to the present invention, and visible in this view, is that the plug portion 2 is rigidly held in a space that lies above the plane of the washer-shaped mounting flange 5. Also important and visible here, is that each of apexes 7 of the spider-like legs reside above the plug portion 2. In this particular embodiment, each first segment 3 of each leg is convex, and each second segment of each leg is convex, with respect to the entire valve. What is not visible for obvious reasons is the resistive force that is present in the valve and in particular with respect to vertical displacement of the plug portion 2 away from the flange 5. That is, due to the configuration of the stiff leg segments 3, 4, there is a resistance against vertical distancing of the plug portion 2 away from the mounting flange 5. With that resistance, the present valve 1 may be fastened into a valve assembly with the plug portion 2 biased down against an upstanding valve seat. The built-in biasing force that the legs apply to the sealing plug is what makes the valve work. The biasing force will return the plug portion 2 back into sealing position on a valve seat after the opposing force is removed. The operation of the present valve is explained below.

Still referring to FIG. 1, the hinging connections in the valve 1 are denoted as elements 6, which are the connections between the second leg segments 4 and the mounting flange 5; elements 7, which are the connections between the two segments of each of the legs; and elements 8, which are the connections between the first leg segments 3 and the sealing plug portion 2. In the particular embodiment illustrated in FIG. 1, the leg segments 4 are shown to merge into the mounting flange 5 at positions around the outer periphery of the washer-shaped flange. This is only one embodiment, as it is also possible, and perhaps more desirable, to have each leg segment 4 merge into the washer-shaped flange 5 more toward, or even at, the inner periphery of the washer-shaped flange, i.e. around the circumference of the washer aperture. The precise location of the merge segment 6 will likely depend on the ease of molding the valve, i.e. adjustments in the design such that the part can be removed from the mold.

Still referring to FIG. 1, and as mentioned, it is preferred that each of these hinging connections, 6, 7, and 8, be embodied in the form of living hinges, i.e. thinner molded plastic areas that, due to the thinness of the material, are receptive to preferential bending in only that localized region. In this particular embodiment, there happen to be no mounting holes or protrusions provided on the mounting flange 5 that may have been used for indexing and/or fastening the flange into a valve assembly, although holes and/or protrusions are always an option. In this case, the mounting flange may be stiff enough to press-fit into a mounting recess provided within a valve assembly. In this case, a round recess may be provided in a bottle closure having a diameter similar to the outer diameter of the flange 5, and the valve 1 may be simply pressed into this circular recess.

Figure 2:
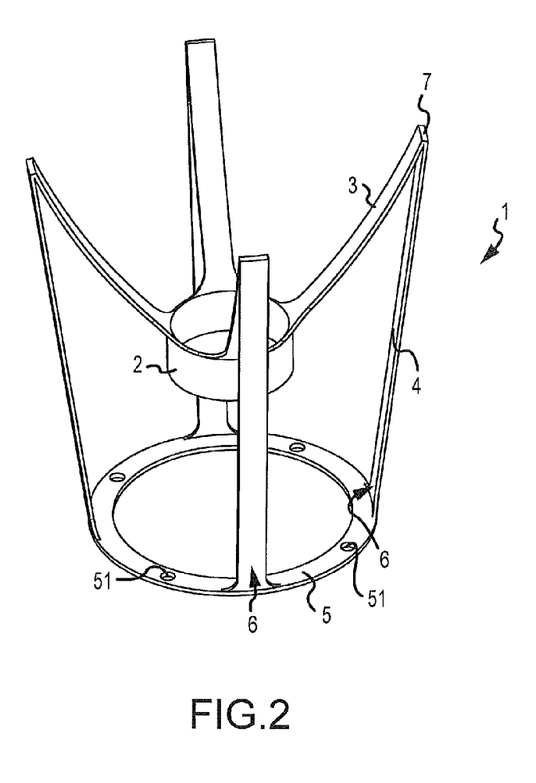
FIG. 2 illustrates a top perspective view of another embodiment of the movable valve of the present invention, showing four "spider-like" segmented legs connecting a mounting flange portion to a plug portion.

FIG. 2 illustrates another embodiment of the present valve 1 that also provides a biasing force such that the valve may be used to temporarily seal an orifice in a liquid dispensing operation. The valve 1 comprises a cup-shaped sealing plug member 2 connected by four circumferentially spaced dual-segmented 3, 4 spider-like legs to a mounting flange 5. In this particular embodiment, each of the second leg segments 4 are nearly straight rather than curved, and each first leg segment 3 is curved substantially concave with respect to the entire shape of the valve 1. When the sealing plug 2 is vertically distanced away from the mounting flange 5, the stiffness inherent in the first leg segments 3 will result in a pushing outward of the longer second segments 4. Each of the three hinging points in each of the legs will hinge open to some degree, depending on the length of the vertical displacement of plug 2 away from flange 5. The hinging points are the same as in the embodiment of FIG. 1. That is, the legs of the valve 1 in FIG. 2 will hinge at positions 6, 7, and 8, with the angles between plug 2 and segment 3, between segment 3 and segment 4, and between segment 4 and flange 5 each opening up to larger angles as the plug portion 2 of the valve is distanced up away from the flange 5.

Still referring to FIG. 2, the valve 1 includes mounting holes 51 provided in the mounting flange 5. These types of holes, which may vary in size, shape and number, can be used to locate the valve 1 correctly in a corresponding valve assembly, and/or may be used to help secure the valve 1 into the valve assembly. In this particular embodiment, four small holes are provided through the washer-shaped mounting flange 5 and are spaced evenly around the circumference of the washer. Certainly any spacing between the legs of the valve, and between the mounting/indexing holes of the mounting flange, is conceivable.

Figure 3:
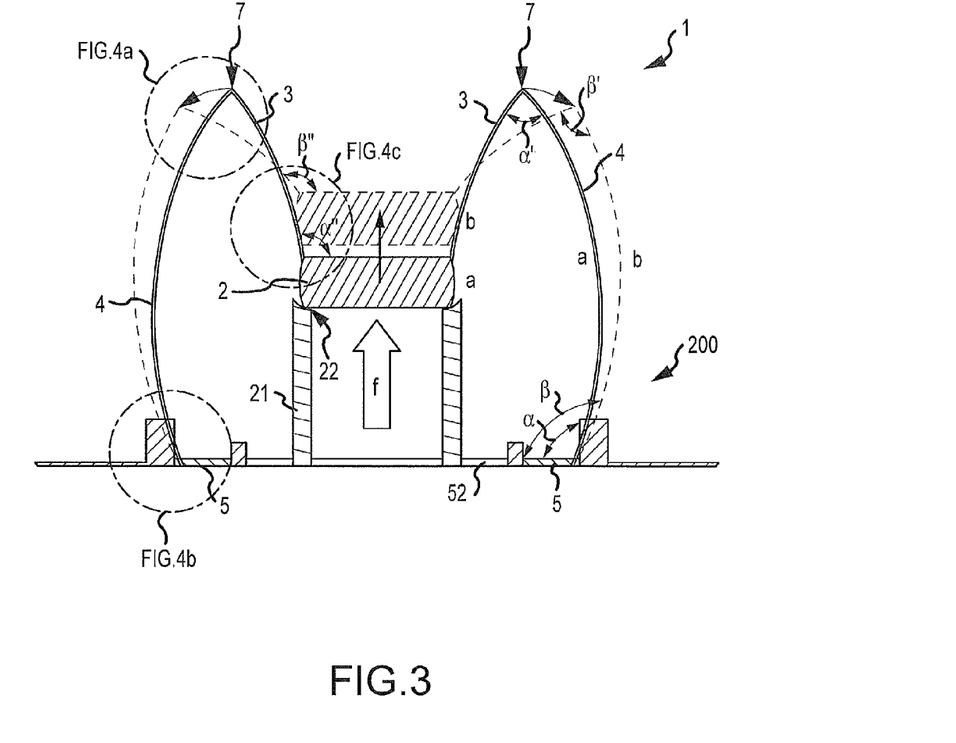
FIG. 3 depicts a front cross-sectional view of an embodiment of the present valve, showing the movement of the plug portion and segmented legs from position a to position b during normal operation of the valve.

FIG. 3 shows a front cross-sectional view of a preferred embodiment of the present valve, illustrating the actuation of the valve. The valve 1 is shown mounted into, and participating as a component of, a valve assembly 200, such that the sealing plug 2 is biased closed against the annular end 22 of a liquid flow pipe 21. As detailed above, the mounting flange 5 of the present valve 1 may be press-fit into a circular recess provided in the valve assembly 200, and that is the preferred mounting method in this particular embodiment. Mounting flange 5 is seen to be pressed between two concentric circular walls that protrude vertically up from the bottom wall 52 of the valve assembly 200. The illustration in FIG. 3 shows the valve 1 in either of two positions: "a," the biased closed position, which is the resting position for the valve in the valve assembly; and position "b," which is the open position where the sealing plug 2 has been vertically displaced off the valve seat 22 by some applied force "f" indicated in the block arrow. The biased closed position is made possible by the bowing leg segments 3 and 4, and the rigidity inherent in these leg segments. With the mounting flange 5 immovably pinned into the valve assembly, the sealing plug 2 is pressed against the upstanding pipe 21 such that there is a sealing fit between the sealing plug 2 and the annular lip 22 of the standing pipe 21. As mentioned above, the shape of the sealing plug 2 is designed such that the sealing fit into the valve seat 22 is enhanced. Furthermore, resiliency that may be molded into the sealing plug 2 allows the plug 2 to meld to the shape of the seat 22, deforming to fit onto and partially into the valve seat in this biased closed position. The force "f" applied to the underside of the sealing plug 2 to vertically displace it may be provided from the insertion of a mechanical structure up into the standing pipe 21, or it may be supplied by an increase in liquid or gas pressure entering in from below. Increases in gas or liquid pressure may be the result of a heating of a containerized volume of gas or liquid, or it may come from a squeezing of a fixed volume of liquid or gas, such as by deformation of a container onto which the valve assembly 200 is fitted. In the case where this force "f" is gas or liquid pressure, the valve 1 functions as a "relief valve." In the case where the force "f" applied is a mechanical force, the valve 1 is preferably configured to operate as a dispensing valve with a spigot or other physical device inserted up into the standing pipe 21. Such intrusion by a smaller diameter pipe up into the standing pipe 21, with displacement of the plug from position "a" to position "b," may have the purpose of starting liquid flow in either direction through the pipe 21. It is possible that a standing volume of liquid resides above the valve 1, and thus the insertion of a spigot into the pipe 21 and the lifting of the valve plug 2 off the valve seat 22 will start the flow by gravity of the liquid. In this case, the end of the inserted spigot may have side inlets so that the end of the inserted spigot isn't sealed by the very plug 2 that is being lifted from the seat. Alternatively, the spigot pushed into the standing pipe 21 may set the stage for injection of liquid up from the inserted spigot through the valve seat in the same direction as the applied force "f." For example, in a medical device application, a blunt syringe needle may be inserted into the assembly 200 in the direction shown by the block arrow "f," but a subsequent syringing of liquid may comprise the actual force "f" that pushes the valve plug 2 open. Or, the syringe may be inserted to a depth sufficient to first open the valve plug 2 from the seat 22, and then liquid is injected around the already opened plug 2. In any case, the plug portion 2 of the valve 1 is displaced vertically with a force "f" to temporarily break the seal between the plug 2 and the annular opening 22 of the standing pipe 21 such that liquid or gas may pass through the standing pipe 21 in either direction as gravity or applied pressure dictate.

Still referring to FIG. 3, the vertical distance that the plug 2 is displaced from the valve seat 22 is determined by either the length of the spigot that is inserted to physically push the plug 2 off the seat 22, or by the amount of pressure (gas or liquid) impinging in the direction of block arrow "f" as indicated in the drawing, or by an additive effect of both if the valve is designed for that type of use. When the plug 2 is displaced off from the valve seat 22, such as by insertion of a tubular spigot, a number of changes to the shape of the valve 1 occur. As mentioned, the spider-like legs, comprised of two segments, 3 and 4, each, are generally stiff and not stretchable. These segments may bend to some extent, but primarily they bow with concomitant changes in the angles at the connection points between the leg segments at the flange 5 and plug 2, and changes in the angles between first leg segments 3 and second leg segments 4. FIG. 3 illustrates a biased closed position "a" and a forced open configuration "b". The starting angle $\alpha$ is that angle formed between the generally planar and preferably washer-shaped mounting flange 5 and the second leg segment 4 across the living hinge region where these elements are co-molded in a unitary construction. Recall that the second leg segment 4 may be straight, or it may have concave or convex curvature. Preferably it is straight or curved slightly convex. Even if the leg segment 4 is perfectly straight and not curved, it is preferred that starting angle $\alpha$ is greater than 90°. Preferably this starting angle is about 90°-100°. When plug 2 is displaced, the angle $\alpha$ increases to the angle $\beta$ as shown. The angle $\beta$ is greater than angle $\alpha$, and is preferably about 95°-135°. Similar hinging is seen at other hingible positions in the valve when the valve is actuated. For example, the angle $\alpha'$ is the angle between the two leg segments 3 and 4 in each of the legs when the valve is in the biased closed position "a". That angle is preferably about 25°-45°. When the valve is actuated, the angle between the segments opens up to angle $\beta'$ as shown. That angle is preferably about 45°-90°. The opening of the angle between leg segments is made possible by the presence of a living hinge 7 between segments 3 and 4 in each of the legs. As mentioned, a living hinge is a thinner area of plastic created in a contiguous molding operation. Therefore, even though leg segments 3 and 4 are molded from a single piece of plastic, a thinner region 7 at the apex of the leg allows the leg to bend at this elbow-like structure. For the leg segments 3 and 4 in each leg, the angle $\alpha'$ increases to $\beta'$ when the valve is actuated from position "a" to position "b." Lastly, the angle between the valve plug 2 and the first leg segment 3 also changes when the valve is actuated. The angle $\alpha''$ is that angle formed between the first leg segment 3 and the top surface of the plug 2 when the valve is in the biased closed position a. The angle $\alpha''$ is preferably about 90°-110°. When the valve is actuated and the plug 2 lifted, angle $\alpha''$ increases to angle $\beta''$. The angle $\beta''$ is preferably about 100°-180°. As shown in the illustration, the leg segment 3 lays down more horizontally as the valve is actuated. The hinging arrangement here is in part possible by a thinner plastic region molded between the stiff leg segment 3 and the plug 2, and also in part by the resiliency that may be present in the plug 2. As the stiff leg 3 is bent over closer to horizontal, parts of the plug 2 can stretch and help accommodate this increasing angle of attachment of the leg and the stresses resulting from that bend. In summary each angle $\alpha$, $\alpha'$, and $\alpha''$ increase to $\beta$, $\beta'$, and $\beta''$ respectively when the valve is actuated between the biased closed position "a" and the open flow position "b". Of course, these angles will vary when changing the relative sizes of the components of the valve. However, FIG. 3 represents a very preferred embodiment, and the relative sizes and angles of the various components work to form a valve that not only seals against the opening of an upstanding pipe, but one that also actuates smoothly, reversibly and reliably.

Still referring to FIG. 3, it is important to note that there is an obvious limitation to the distance that the plug 2 can be pushed off from the valve seat 22. At some point in the vertical displacement of plug 2, the first leg segment 3 will be bent beyond horizontal and will begin to impinge onto the side wall of the plug 2. This extreme position is not expected to be necessary, and can be prevented by either limiting the length of the orifice used to mechanically push the plug 2 upwards, or by limiting the amount of gas or liquid pressure "f" exerted on the plug 2 in a relief valve scenario. At some point within an extreme displacement scenario, some fatigue is likely to appear on the hinging connection points, in particular the connection between the first leg segment 3 and the plug 2. It is best to limit the stroke of the plug 2 such that fatigue in the plastic connections is not an issue even after many repeated actuations of the valve.

Figure 4A:
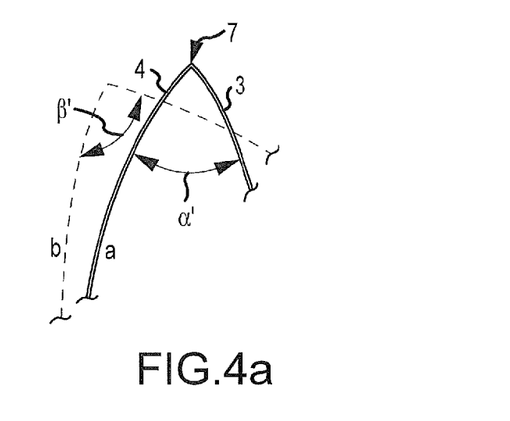
FIGS. 4a, 4b and 4c each illustrate magnified close-up views of the changing angles of the valve components during actuation of the valve.
Figure 4B:
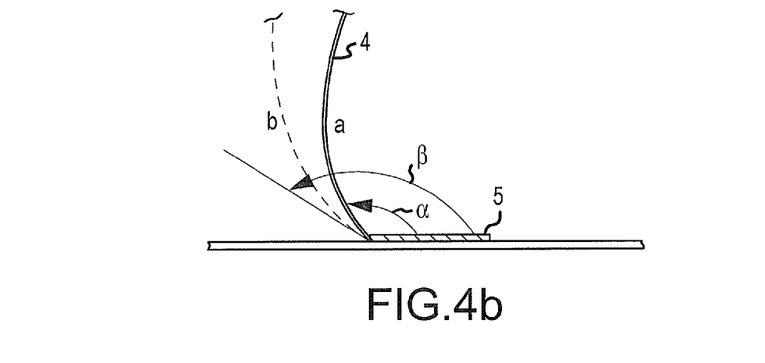
Figure 4C:
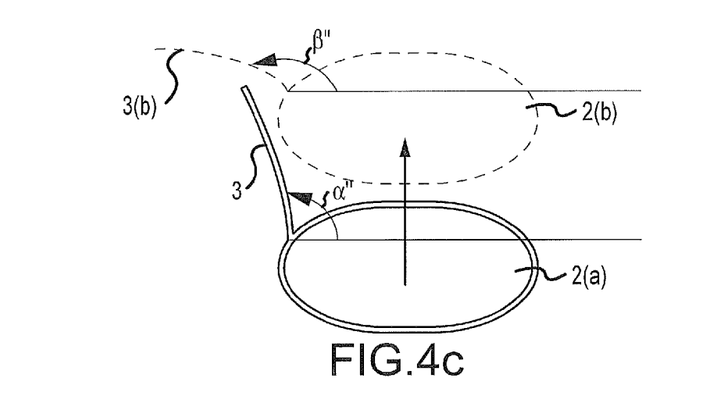

FIG. 4 is a compilation of various magnified portions of FIG. 3 as indicated. FIG. 4a is a magnification of the "elbow" region of any one of the spider-like legs as the angle changes during actuation of the valve. Similarly, FIG. 4b is a magnification of the connection between the second leg segment 4 and the mounting flange 5, showing the change in the angle between these two components as the valve is actuated. Lastly, FIG. 4c is a magnification of the connection between the first leg segment 3 and the plug 2, illustrating in magnified view the change in the angle between these components as the valve is actuated. As mentioned, the leg segments may be curved to some degree. Therefore the angles have to be imagined by drawing a tangent to the curved surfaces beginning from the hinging joint to a point on the curvature of the leg segment. Also, if the plug 2 is bulbous, perhaps even spherical, the angle of attachment of the leg segment 3 to the plug 2 has to be envisioned by striking a horizontal line across the bulbous plug 2 and a line running from the hinging joint tangentially up to a point on the leg segment 3 and measuring the angle between these two lines.

Figure 5:
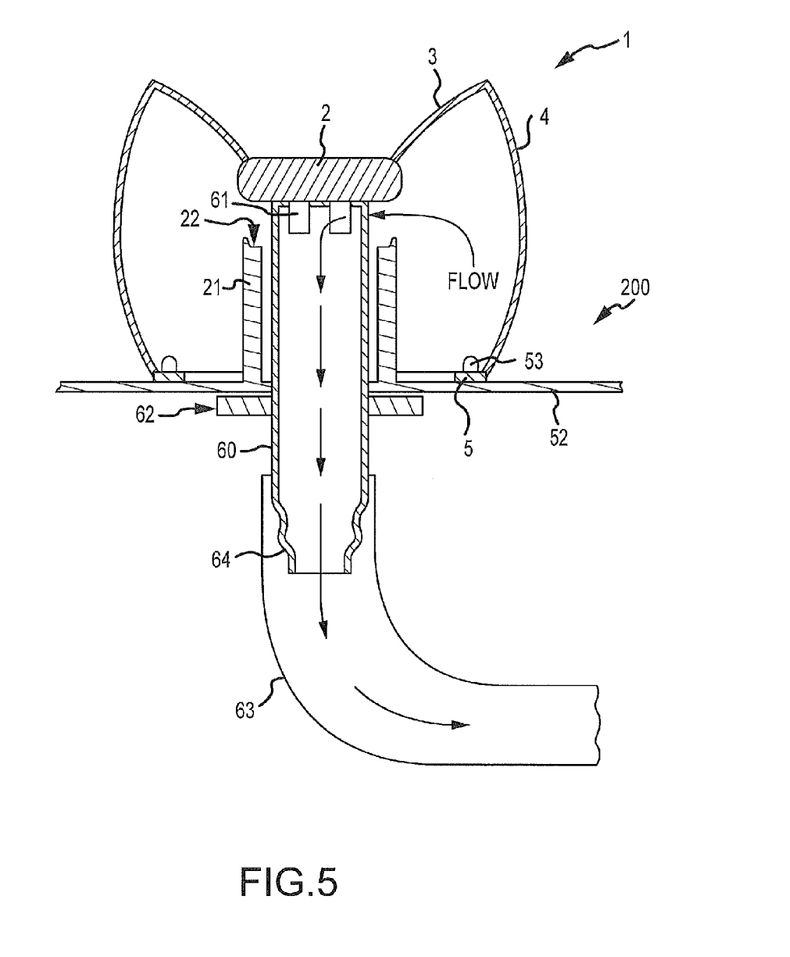
FIG. 5 illustrates an embodiment of the valve when mounted into a bottle closure to form a liquid dispensing assembly, with a spigot inserted into the closure, actuating the valve causing flow of liquid through the valve under gravity.

FIG. 5 illustrates an embodiment of the present valve incorporated into a closure for a bottle and in dispensing position, i.e. actuated. In this front cross-sectional view, the valve 1 is seen to be mounted within closure 200 that together function as a valve assembly. The valve as described in detail above comprises the movable plug element 2, the mounting flange 5, and at least two segmented spider-like legs that comprise first leg segment 3 and second leg segment 4. As seen in this diagram, the mounting flange 5 of the present valve is pinned against the lower floor 52 of the closure 200 by a mounting plate 53. This ensures that the mounting flange 5 remains immovable during use of the valve and the closure assembly. The actuation of this particular embodiment of the present valve is via the mechanical insertion of a spigot 60 that physically pushes up the valve plug 2 off from the valve seat 22. The closure here comprises an upstanding pipe element 21 that ends in an annular opening 22 that is the valve seat for the closure. A variety of ledges may be tiered into the annular opening to assist in forming a seal between the valve plug 2 and the opening of the pipe. The upstanding pipe 21 is preferably integrally molded together with the floor 52 of the closure 200. Not shown in this drawing may be positioning elements or other features that help to position the mounting flange 5 properly around the upstanding pipe 21. The spigot most useful in this liquid dispensing configuration comprises a "castle-like" end 61 so that the open end of the spigot doesn't seal against the bottom of the plug 2 when the spigot presses up and vertically displaces the plug 2. In this dispensing configuration, it is expected that a liquid is provided in a bottle above the valve arrangement. That is, the bottle of liquid sealed with the closure 200 is inverted in this dispensing situation such that the flow of liquid may be achieved simply by gravity. When the valve 1 is actuated by the insertion of spigot 60, the liquid flow by gravity is simply through any of the ports 61 provided on the end of the spigot 60, down through the length of the spigot and out through a tubing 63 that may be provided on the end 64 of the spigot 60. As discussed above, the vertical displacement of the valve plug 2 is preferably limited in stroke length to avoid premature fatigue in the plastic of the valve, and this is accomplished here by having a plate 62 integrally molded into the spigot to define the usable length of the spigot end. This plate 62 will stop against the outside of the closure 200, thus stopping further insertion of the spigot into the standing pipe 21. In this way the plug 2 is displaced to a predictable height above the valve seat 22. As discussed above, the segments 3 and 4 of each of the spider-like legs bow and hinge as necessary to accommodate the vertical movement in the plug 2. Segment 3 is expected to move toward a more horizontal position and segment 4 is expected to bow out away from the plug element 2 in this dispensing position for the valve. Removal of the spigot 60 from the closure 200 will cause the valve to spring back into the biased closed position, where plug 2 is pushed against the annular opening 22 of the standing pipe 21 due to the configuration of the bowed leg segments and the materials of construction.

While at least one exemplary embodiment has been presented in the foregoing detailed description of the invention, it should be appreciated that a vast number of variations to the present invention exist. It should also be appreciated that the exemplary embodiment or embodiments are only examples, and thus not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

I claim:

1. An actuatable valve comprising:
a) a sealing plug at least partially resilient and dimensioned to fit sealingly on an annular opening of an upstanding pipe in a valve assembly;
b) a mounting flange oriented below and radially distanced from said sealing plug; and
c) at least two non-resilient legs connecting said sealing plug to said mounting flange, each leg comprising first and second rigid leg segments hingably connected to one another at an elbow-like apex, each of said first leg segments connected hingably to said sealing plug and each of said second leg segments hingably connected to said mounting flange; and
wherein each of said apexes are positioned higher than said sealing plug, and wherein during actuation of said valve, vertical displacement of said sealing plug from said annular opening causes concomitant increase in the angles: (i) between said mounting flange and said second leg segments; (ii) between said first and second leg segments; and (iii) between said sealing plug and said first leg segments.

2. The valve of claim 1, wherein said second leg segments are substantially straight.

3. The valve of claim 1, wherein said second leg segments have convex curvature.

4. The valve of claim 1, wherein said second leg segments are substantially straight and said first leg segments have concave curvature.

5. The valve of claim 1, wherein said first and second leg segments each have convex curvature.

6. The use of the valve of claim 1 in a valve assembly used in liquid dispensing.

\* \* \* \* \*